Dec. 7, 1954   B. D. HOLBROOK ET AL   2,696,599
CHECK CIRCUITS
Filed Feb. 12, 1953   9 Sheets-Sheet 1

FIG. I

INVENTORS: B. D. HOLBROOK
W. A. MALTHANER
H. E. VAUGHAN
BY
ATTORNEY

Dec. 7, 1954  B. D. HOLBROOK ET AL  2,696,599
CHECK CIRCUITS
Filed Feb. 12, 1953  9 Sheets-Sheet 2

INVENTORS
B. D. HOLBROOK
W. A. MALTHANER
H. E. VAUGHAN
BY
ATTORNEY

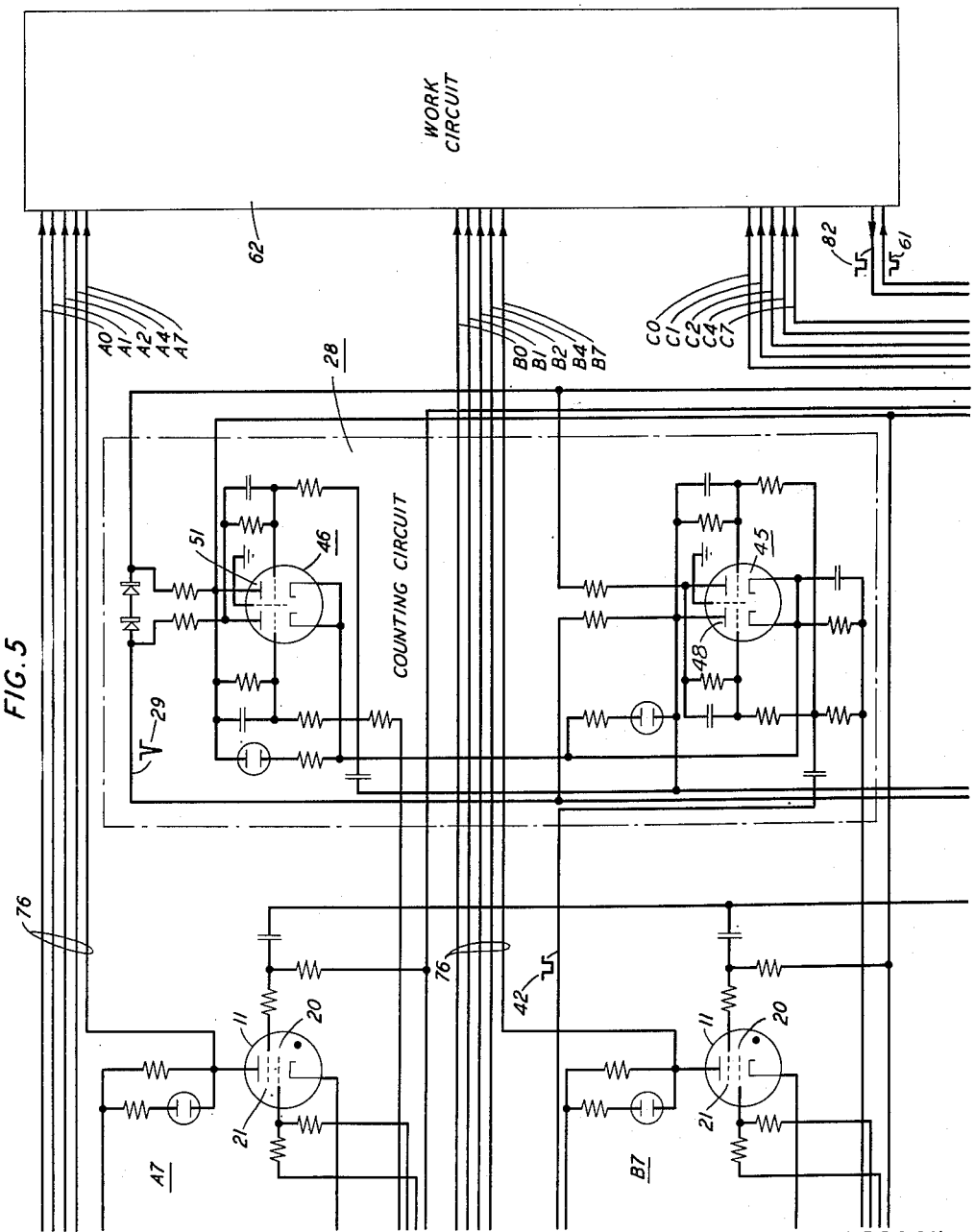

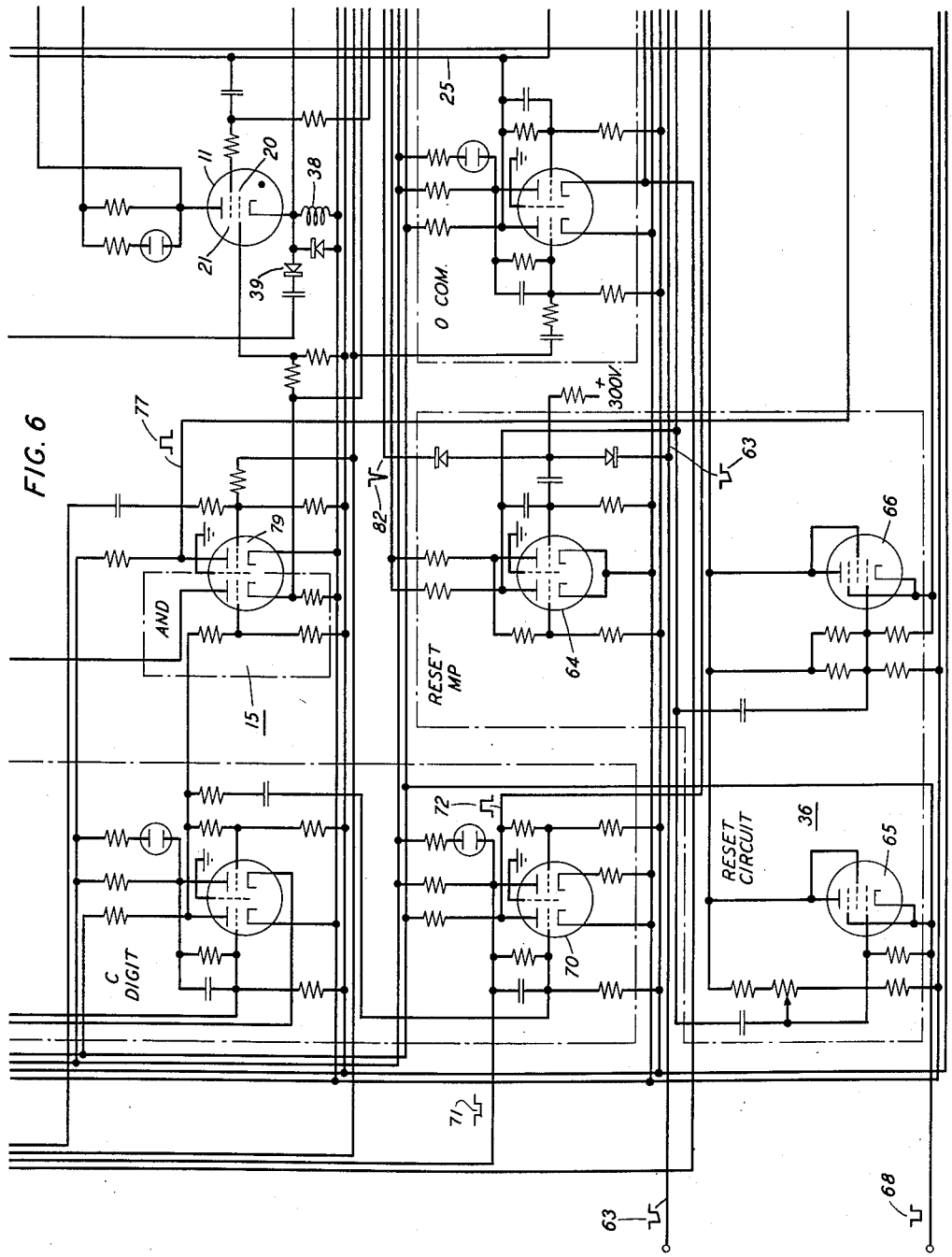

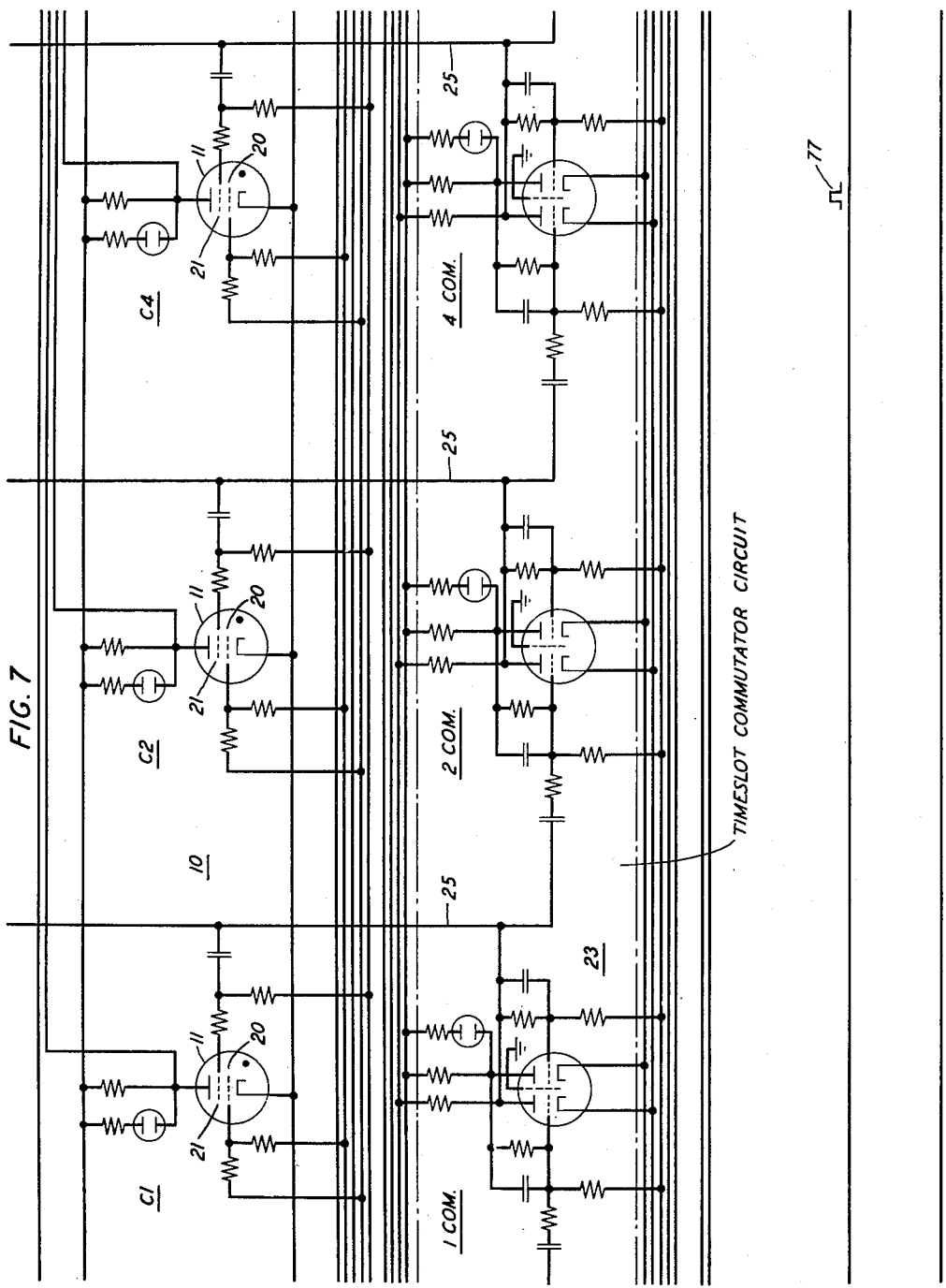

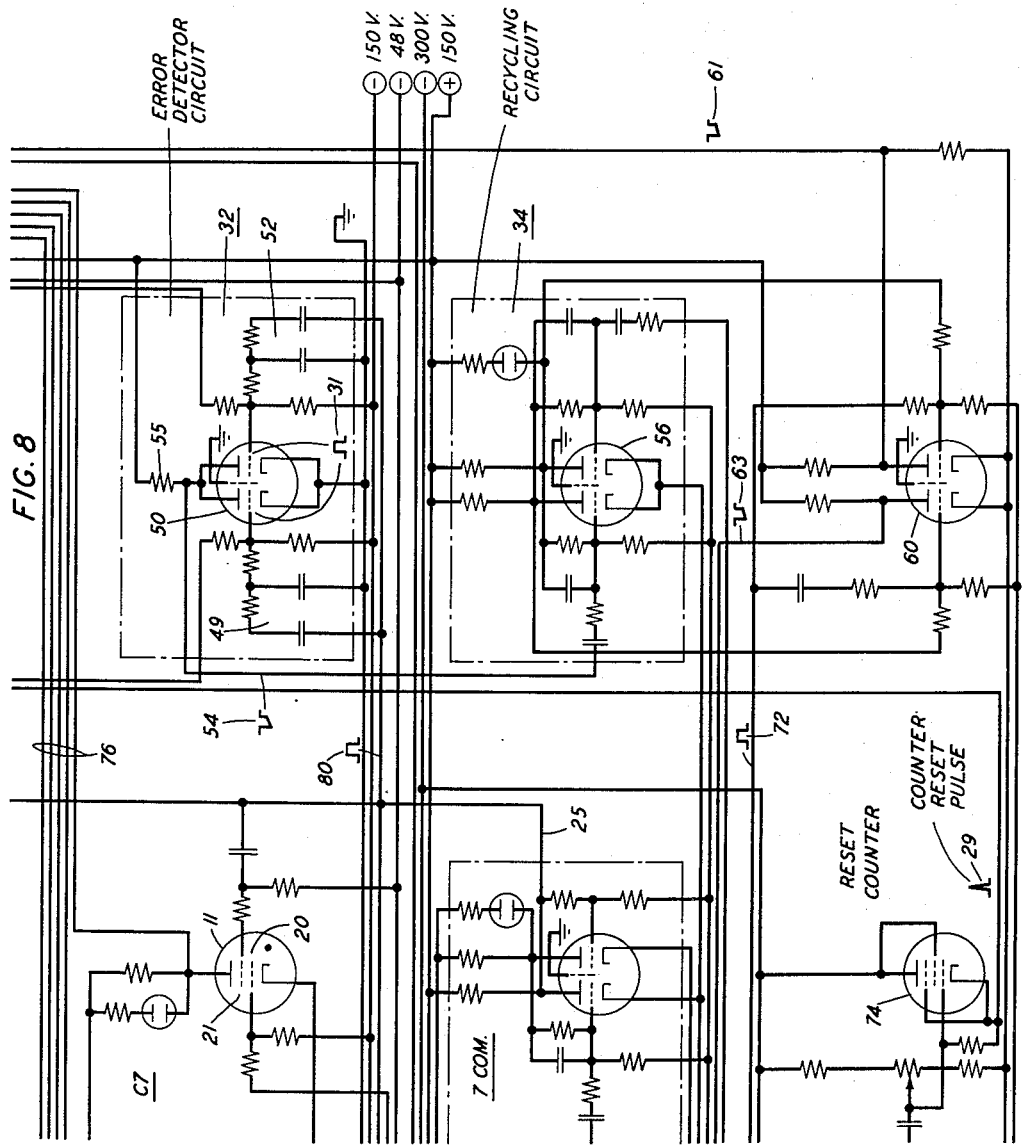

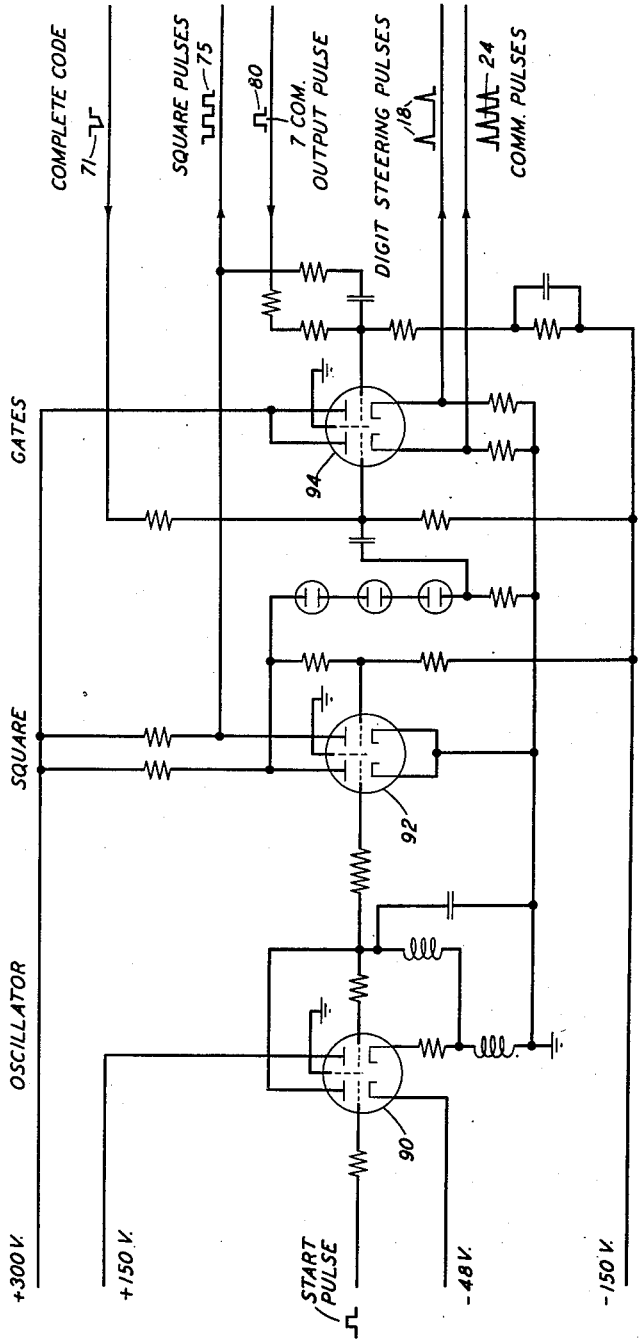

United States Patent Office 2,696,599
Patented Dec. 7, 1954

---

2,696,599

CHECK CIRCUITS

Bernard D. Holbrook, Madison, William A. Malthaner, New Providence, and Henry E. Vaughan, Chatham, N. J., assignors to Bell Telephone Laboratories, Incorporated, New York, N. Y., a corporation of New York Application February 12, 1953, Serial No. 336,562

8 Claims. (Cl. 340—147)

This invention relates to check circuits and, more particularly, to such circuits wherein the information to be checked comprises a succession of coded pulses appearing on a single wire in time sequence.

In telephone systems, the subscriber placing the call will dial the number of the party called, which number comprises both a designation of the called office, such as CHelsea 3, and the directory number of the called party in that office. In general telephone practice, the designation of the called office is utilized by the calling office to assign a proper out trunk while the directory number of the called party is transmitted to that called office over this trunk. Advantageously, the called number is transmitted in a 2-out-of-5 code in which each digit of the number is represented by this code.

In application Serial No. 158,218, filed April 26, 1950, of W. A. Malthaner and H. E. Vaughan, there is described a telephone signaling system in which the called number is transmitted to the called office by pulse code modulated signals on a 2-out-of-5 basis. In such a system, it is advantageous to check the code at the called office to ascertain that it is plausible and, if it is not, send back a signal requesting the calling office to transmit the code again. In the system described in the above mentioned application, the code is registered in electron discharge devices in registers for each digit in the code, and an individual check circuit is utilized for each digit register. This requires a large number of check circuits, thereby increasing the cost and complexity of the system. Further, the employment of a single check circuit for each digit register would be prohibitive of the use of the circuit in digital computers and other systems wherein it is desired to check information messages employing more than just the four digits generally utilized in telephone signaling systems of the type described in the above mentioned application.

Further, in various electrical circuits and systems, the information message may comprise a large number of digits which are coded in variations of an $x$-out-of-$n$ code wherein an acceptable code is not simply one in which there are $x$ signal pulses but in which there may be, for example, $x$ or any multiple of $x$ signal pulses, or $x$ and $x'$ pulses and any number of pulses which is $\alpha y$ greater than $x$ or $x'$, where $y$ is a specified number and $\alpha$ is any number.

A general object of this invention is to provide an improved circuit for checking the acceptability or plausibility of information appearing as a series of signals in time sequence. This information is acceptable if it is in a code having the property that a set of received code elements includes a number of active code elements or signals equal to a specified number or set of numbers, increased by any multiple of another specified number. This may be expressed by saying that a code is acceptable if it is in the form $$(x+\alpha y)\text{-out-of-}n$$

where $x$ is any number or set of numbers, $\alpha$ is a multiplier, $y$ any specified number and $n$ the total number of code elements, where $$x \leq y \leq n$$

In the specific instance wherein $y=0$, the code is an $x$-out-of-$n$ code. It is, therefore, a specific object of this invention to provide an improved circuit for checking the plausibility of an $x$-out-of-$n$ code appearing in time sequence.

It is another object of this invention to provide an improved circuit for checking the registers in which the code is stored during the checking operation.

A further object of this invention is to enable the checking of large information messages employing many digits on an $(x+\alpha y)$-out-of-$n$ basis in an efficient manner whereby common circuit elements are employed to determine the plausibility of each digit stored in the different registers during the checking operation.

These and other objects of this invention are attained in one specific illustrative embodiment wherein an information message comprising N digits on an $x$-out-of-$n$ basis is checked by storing successive digits in successive ones of N registers, each comprising $n$ four-element gas tubes. A digit steering circuit steers each digit to its proper register and a time slot commutator circuit enables each four-element gas tube in each register in succession, firing of a particular gas tube to store a pulse in a register being thus controlled by the concomitant appearance at that tube of a voltage from the digit steering circuit, a voltage from the time slot commutator circuit, and a pulse in the signals being received.

Each register tube is connected to a single common counting circuit which counts the number of tubes fired in each register. At the end of a digit interval, an inspect pulse is applied to an error detecting circuit causing it to ascertain the condition of the counting circuit which is so arranged that there is a unique condition for a proper and plausible code. If this unique condition is present, indicating that the digit stored in that particular register during that digit interval is plausible, no action is taken by he check circuit. If, however, an implausible and erroneous code has been registered, the counting circuit will not have counted to its unique condition, and the error detecting circuit will cause operation of a recycling circuit which will reset the registers, the digit steering circuit and the time slot commutator circuit and cause an error signal to be transmitted back to the prior circuitry advising it that it has sent an erroneous code.

In this specific embodiment, the counting circuit comprises a binary counter employing a plurality of tubes and the unique condition of that counter occurs when the outputs of those tubes indicate a count of the appropriate number of register tube firings. This output may advantageously be the binary number equivalent to the decimal number $x$ in the $x$-out-of-$n$ code or may advantageously be only a portion of that output if $n$ is not equal to $2^a$, where $a$ is any integer. Thus, if the code to be checked is a 3-out-of-6 code, the output of the counter circuit need not be the complete binary number 011, which is the binary equivalent of the decimal 3, but need be only 11, the least significant digits of the number, as that combination is unique of the possible outputs for that code. Similarly, if a 2-out-of-5 code is to be checked, only the least significant digits 10, i. e., considering the code to be X10, need be utilized as they are unique from binary 0, (000) to binary 5, (101).

It is, therefore, a feature of this invention that a counting circuit be common to all the registers and that the counting circuit have a unique condition indicating that an acceptable and plausible number of pulses have been stored in each register circuit through the firing of the register tubes.

It is a further feature of this invention that this unique condition be ascertained by an error detecting circuit which inspects the condition of the counting circuit after each digit interval and in appropriate cases advises a recycling circuit to reset the circuit and to cause an error signal output to be generated.

It is a further feature of this invention that the counting circuit count in an incomplete binary code.

It is a still further feature of this invention that the inspect pulse applied to the error detecting circuit to enable it to inspect the condition of the counting circuit be derived from the last discharge device of the time slot commutator circuit through a delay circuit assuring sufficient time to elapse for the firing of a register discharge device in the last time slot and the counting thereof before the inspection of the counting circuit.

A complete understanding of this invention and of these and various other features thereof may be gained from consideration of the following description and the accompanying drawing, in which:

Figs. 3 through 8 are detailed schematic representations of a circuit in accordance with the embodiment of Fig. 1;

Fig. 9 is a detailed schematic representation of a control circuit for supplying the timing or synchronizing pulses to the circuit of Fig. 3; and Fig. 10 is a key diagram showing the arrangement of Figs. 3 through 9.

Figure 1:
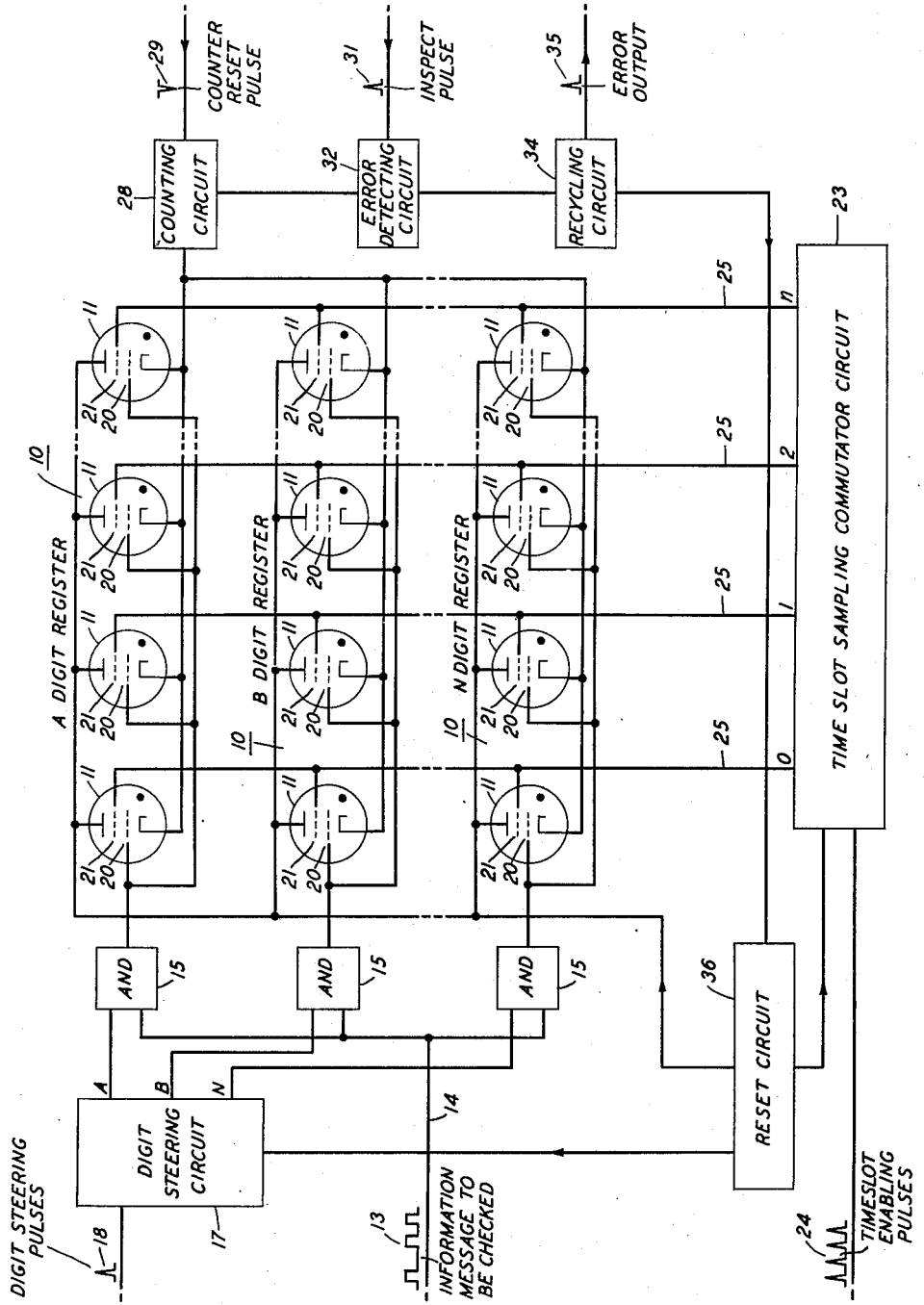
Fig. 1 is a simplified schematic representation, mainly in block form, of one specific illustrative embodiment of this invention.

Turning now to the drawing, in the specific illustrative embodiment of this invention represented in Fig. 1, N digit registers 10 are provided each incorporating $n$ four electrode gaseous discharge devices 11, which may be the hot cathode thyratrons, such as the RCA 5696 and other thyratrons. The information message to be checked comprises a series of coded pulses 13 in time sequence applied by the input lead 14 of the check circuit to an AND circuit 15 for each register 10. The outputs of a digit steering circuit 17 are also applied to the AND circuits 15 and determine which AND circuit 15, and thereby which register 10, is chosen for a particular digit in the information message. The digit steering circuit is advanced one step for each digit of the information message by digit steering pulses 18 applied thereto at the beginning of each digit, as clearly seen in the time plots of Fig. 2 wherein coded pulses 13 comprising the decimal message 379 are depicted.

The output of the AND circuits 15 are applied to one control electrode 20 of each of the gaseous tetrodes 11. The other control electrode 21 of each tetrode 11 is connected to a time slot sampling commutator circuit 23 which advances once each time slot in every digit, on application thereto of time slot enabling pulses 24, thus each output lead 25 from the time slot sampling commutator circuit has a voltage applied to it in succession for each digit of the message being checked. A particular tetrode 11 will fire, therefore, when the proper pulse 13, output from digit steering circuit 17, and output from time slot sampling commutator circuit 23 are present. Thus, if a pulse 13 appears in the second time slot in the first digit of a code message, indicating a code 1 in the A digit, the second tetrode 11 of the A register will fire and only that tetrode.

Each register 10 is connected to a single counting circuit 28 so that whenever a device in any register fires, a pulse is applied to the counting circuit 28. Circuit 28 counts the number of devices 11 fired in each register 10, being reset after each digit has been registered by a counter reset pulse 29. However, in the period between the completion of the pulses of a digit and before the counter reset pulse 29 is applied to an error detecting circuit 32 causing that circuit to look at the counting circuit 28. If the counting circuit 28 has counted the proper number of register device outputs, i. e., has counted to $x$ if an $x$-out-of-$n$ code is being checked, the error detecting circuit will take no action. However, if any other number is present in the counting circuit 28, then the error detecting circuit 32 will enable a recycling circuit 34 causing an error output pulse 35 to be generated and also enabling a reset circuit 36 which resets the registers 10, the digit steering circuit 17, and the time slot sampling commutator circuit 23.

Counting circuit 28 will thus individually count the number of discharge devices operated in each of the N registers being inspected and then reset after each digit interval. It is, therefore, apparent that N, the number of digits in the code being checked, may be a very large number with no increase in the complexity of the checking circuit. Thus, in accordance with one feature of this invention checking of a message comprising any number of coded digits is facilely and expeditiously attained by the employment of common checking apparatus, including the counting circuit 28 and error detecting circuit 32.

Turning now to Figs. 3-8, there is shown a detailed schematic representation of the specific illustrative embodiment of this invention depicted in Fig. 1. In Figs. 3-8 for purposes of exposition, it has been assumed that the information message to be checked comprises only three digits each on a 2-out-of-5 basis, but it is to be understood that this specific embodiment of this invention is capable of checking messages employing much larger numbers of digits which may be on any $x$-out-of-$n$ basis. As seen in Figs. 3-8 the cathodes of each tetrode 11 in a given register 10 are all connected across an inductor 38 so that operation of any tube in that register 10 produces a pulse across it. The inductors 38 in the three registers 10 are connected together by an "or" circuit comprising diodes 39 and the output 40 of the "or" circuit is applied to the control electrode of an inverter tube 41 seen in Fig. 3. Thus, when any register tube 11 operates a negative pulse 42 appears at the output of the inverter 41. These negative pulses 42 are applied to the two stage binary counter circuit 28 comprising a double triode tube 45 and a double triode tube 46. The normally negative plate 48 of tube 45 is connected to the left grid of a double triode tube 50 of the error detecting circuit 32; the normally positive plate 51 of tube 46 is similarly connected to the right grid of tube 50. If in the first digit interval, none of the "A" register tubes 11 had fired, tubes 45 and 46 would remain normal. At the end of this interval the inspect pulse 31 is applied to the input circuit of both halves of error detecting tube 50. The inspect pulse 31 is derived from the circuit, as described further below, and is applied to the grids of tube 50 through delay circuits 49 and 52 for reasons further set forth below. This pulse 31, in combination with the positive voltage from plate 51, causes a pulse 54 to appear on the plate resistor 55 of the error detecting tube 50 which in turn operates the recycle toggle circuit which comprises the double triode 56. A positive voltage on either lead from plate 48 or 51 will cause the recycle toggle circuit 34 to operate when the inspect pulse 31 occurs at the end of a digit interval. The above conditions describe the operation of the circuit if no code pulses are received during the digit interval. From the above description and the following table, it is thought that the operation of this circuit will be apparent:

| Code Pulses 13 in one digit | Voltage at Plate 48 at end of digit | Voltage at Plate 51 at end of digit | Pulse 54 |
| --- | --- | --- | --- |
| 0 | − | + | Yes. |
| 1 | + | + | Yes. |
| 2 | − | − | No. |
| 3 | + | − | Yes. |
| 4 | − | + | Yes. |
| 5 | + | + | Yes. |

As can readily be seen from the above table and from the circuit, a pulse 54 is applied to the recycle toggle circuit 34 for each final condition of the binary counting circuit 28 except for a count indicating that the code is a plausible one, which in this case indicates that two out of five possible pulses have been received.

The possible outputs of the recycling tube 56 are applied to the two control grids of the two sections of a double triode gate tube 60, seen in Fig. 8. The condition of tube 60 will, therefore, depend on the condition of the recycling tube 56. If no pulse 54 is applied to the recycling circuit 34, nothing will occur in tube 60 as we are only considering at this time the first digit of the code being checked. If, however, this were the last digit of the code, then a pulse 72, indicating that the complete code has been checked, as described further below, would also be applied to the grid of the right-hand section of tube 60 which would conduct indicating that the complete code stored in the register tubes 11 is plausible and transmit a code received pulse 61 to the work circuit 62. If, however, an implausible code has been received and recycling circuit 34 has been enabled by a pulse 54, then the left-hand side of tube 60 will conduct and transmit a reset command or error pulse 63 to a reset monopulser 64 in the reset circuit 36, seen in Fig. 6. Operation of the reset monopulser 64 enables voltage regulator tubes 65 and 66. Tube 65 resets the digit and commutator tubes in the digit steering circuit 17 and time slot commutator circuit 23, respectively, by interrupting the voltages applied to the plates thereof, and tube 66 similarly resets each of register tubes 11. Operation of the reset circuit 36 also causes a pulse 68 to be delivered back to the transmitting circuit advising it to reset the circuits supplying the various synchronizing pulses for this check circuit. The reset command or error pulse 63 is also sent back to the prior circuit that has received the code and advises it that the code was in error; pulse 63 thus is the error output pulse 35 depicted in the simplified block diagram of Fig. 1. In a telephone signaling system of the type described in the above mentioned Malthaner-Vaughan application, the error pulse 63 will advise the circuit that has received the transmitted signal from a distant office that the code was in error and the receiving circuit would then send a signal to the transmitting office requesting it to transmit the code again.

Similarly, after each correct code has been received, which is indicated by a complete counting of the digit steering circuit 17 to a complete code tube 70, seen in Fig. 6, a complete code pulse 71 may advantageously be returned to the prior circuit. An output pulse 72 from the other side of tube 70 is applied to the grid of the right-hand section of tube 60, seen in Fig. 8, to cause transmission of a code received pulse 61 to the work circuit 62, as described above.

Turning now to Fig. 9, there is depicted one control circuit for providing the check circuit of Figs. 3–8 with the properly synchronized pulses. The control circuit may advantageously comprise an oscillator tube operated on application of a start pulse from the prior circuit, which tube supplies a sinusoidal output 91, best seen in Fig. 2, to a squaring tube 92, the sinusoidal output being such that one cycle occurs during each time slot in a digit. Tube 92 provides squared timing pulses 75, also seen in Fig. 2, to both sides of a gating tube 94. From the cathode of the left section of gate tube 94 are taken the commutator sampling pulses 24, provided that a complete code pulse 71 is not present to stop the operation of this circuit. As can readily be seen in Fig. 2, these time slot commutator sampling pulses 24 occur at the instant of the trailing edge of the squared timing pulses 75 and thus in the middle of each time slot. The digit steering pulses 18 are taken from the cathode of the right section of tube 94 and occur when that section has been enabled by an output pulse 80 from the last tube of the time slot commutator circuit 23.

Turning back to Figs. 3–8, pulse 80 is generated by the last tube in the time slot commutator circuit, 7 Com., and indicates that the last time slot has occurred. This pulse 80 is applied to each of the last tubes 11 in the registers 10 and also to the error detector circuits through the delay networks 49 and 52, as described above, so that the occurrence of the inspect pulse 31 to enable the error detecting circuit 32 occurs slightly before the end of the last time slot, as shown on Fig. 2. The inspect pulse 31 is this pulse 80 delayed by networks 49 and 52. By utilizing this delay sufficient time is allowed for a register tube 11 in this last time slot to fire and generate a pulse to be counted by the counting circuit 28.

After each digit has been checked, the counting circuit is reset by a counter reset pulse 29 generated by the reset counter tube 74. Enablement of this tube occurs such that the reset counter pulse 29 is generated after the inspect pulse 31 and before the commencement of the next time slot. This tube is enabled by the pulse 80 of the last tube of the time slot commutator circuit 23 and by the rising edge of a squared timed pulse 75. These two enabling pulses are applied to a gating tube 79, seen in Fig. 6, which then produces an enabling output 77 causing firing of the reset counter tube 74.

Figure 2:
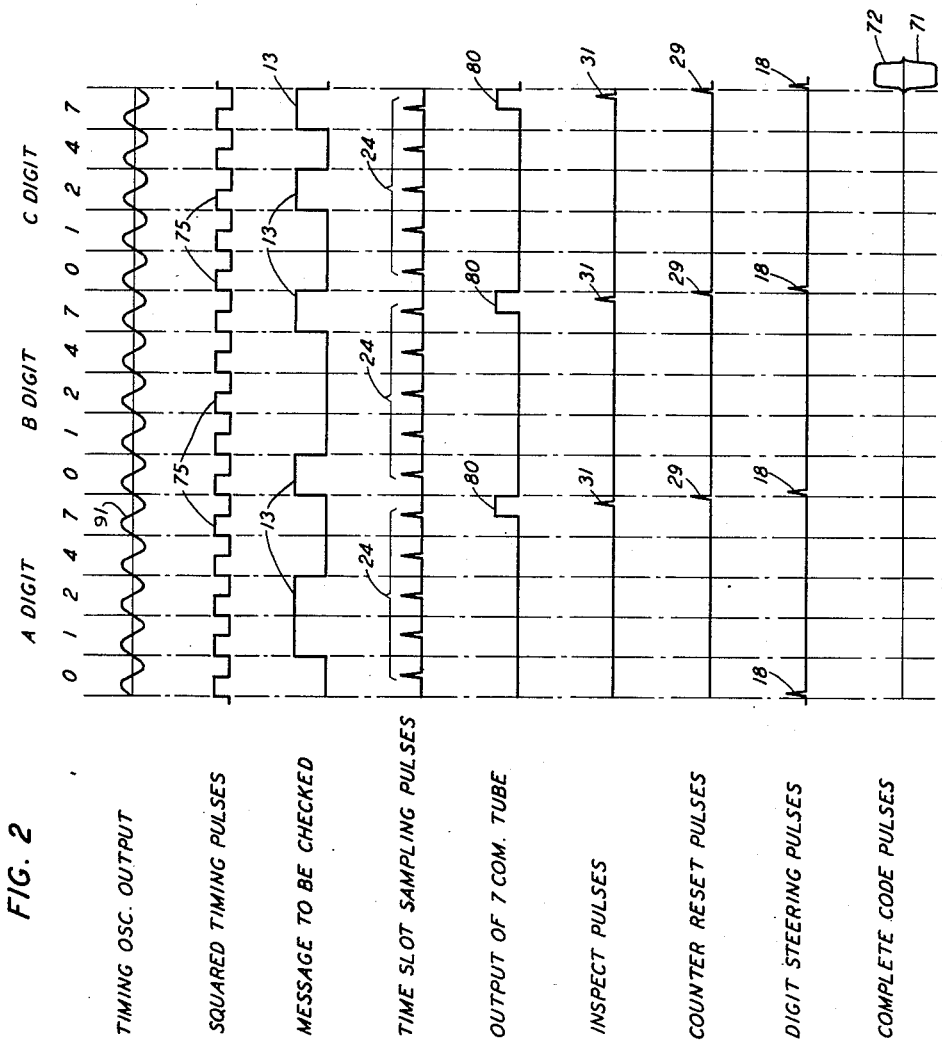
Fig. 2 is a time graph showing the occurrence of various pulses during the operation of the circuit of Fig. 1.
Figure 3:
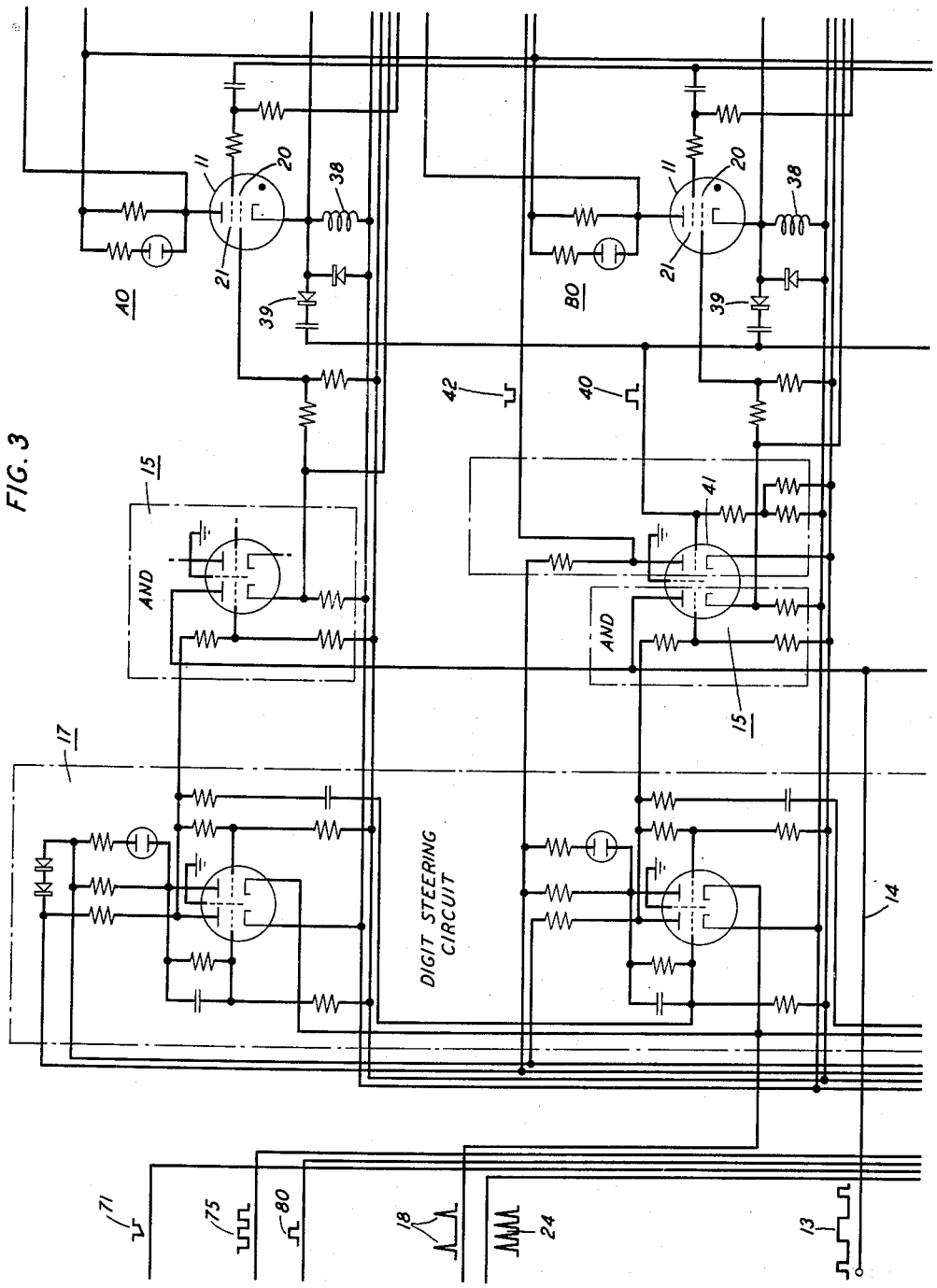
Figure 4:
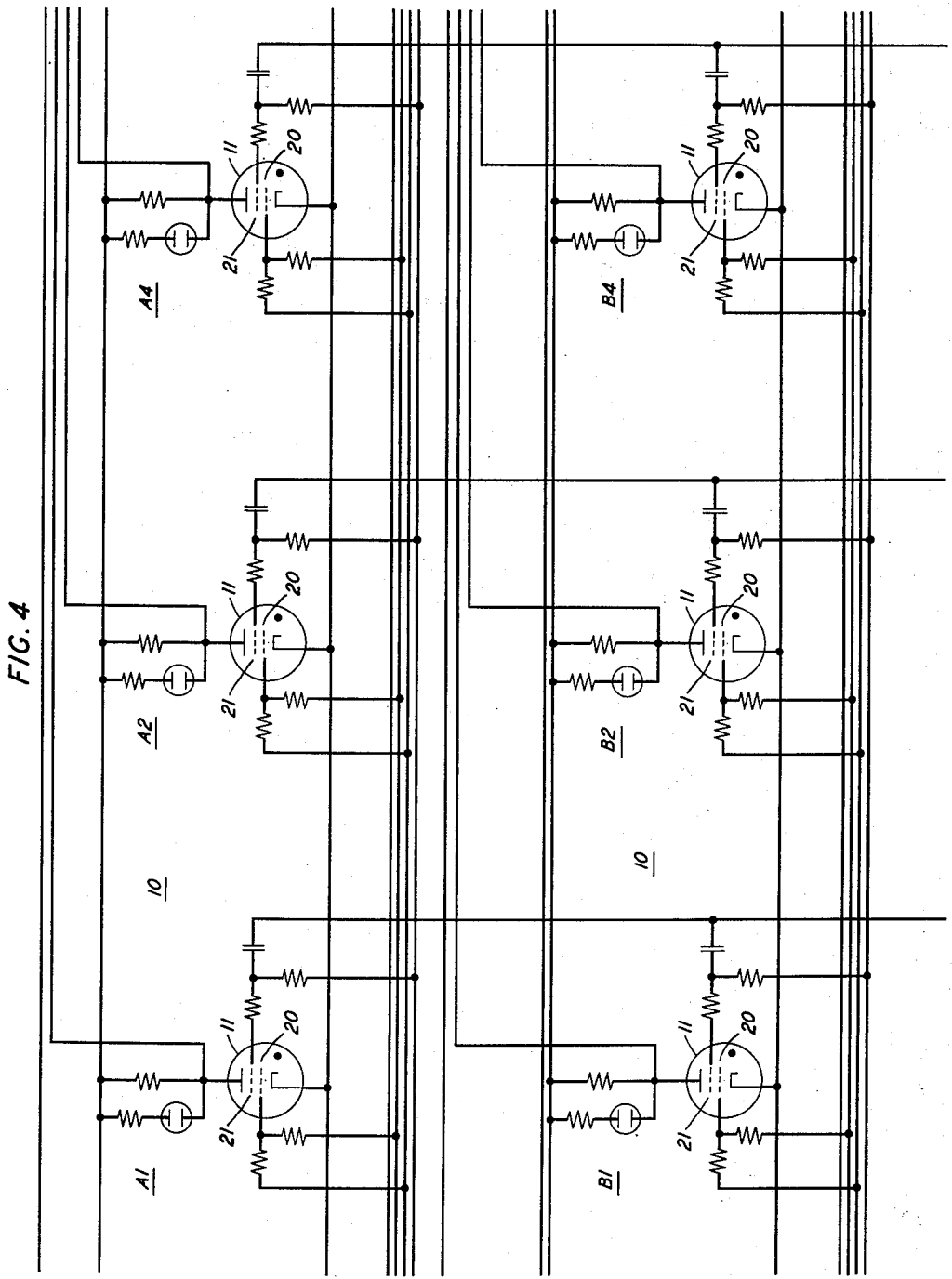

Advantageously, the digit steering pulses 18 are generated by the right-hand section of tube 94 in the control circuit of Fig. 9 on the occurrence of the 7 Com. output pulse 80 and the rising edge of a squared timing pulse 75. Thus, the digit steering circuit 17 is stepped and the counter circuit 28 reset substantially at the same time, just before or at the beginning of the first time slot of the next digit, as shown in Fig. 2.

Advantageously, the plates of register tubes 11 are each connected through leads 76 to the work circuit 62 so that the code registered in the register tubes 11 can be passed on to the work circuit on receipt by the work circuit 62 of a code received pulse 61 from gate tube 60. Such work circuit may comprise registering apparatus for storing the code number and, when this embodiment of this invention is employed in a telephone system, may comprise operating circuits for operating relays to establish the desired path through the called office. A reset pulse 82 is advantageously transmitted back from the work circuit where the code has been stored therein advising the reset circuit 36 that the registers 10 can now be cleared.

While the specific embodiment of this invention described above has checked the plausibility of an $x$-out-of-$n$ code, it is to be understood that the principles of this invention are not limited to the checking of this code alone but are applicable to the checking of any code that has the property that a given set of received code elements is acceptable if and only if the number of active code elements or signals is equal to a specified number or set of numbers increased by any multiple of another specified number. It is believed that other types of codes that may be checked in accordance with this invention will be apparent from a consideration of two specific codes. In certain systems and circuits codes are rendered checkable by the addition of a check signal to each digit so that the total number of signals in the digit is even. Such a code is

| Decimal | Binary-Check | No. of Devices 11 fired in each Register 10 |
| --- | --- | --- |
| 0 | 0000—0 | 0 |
| 1 | 0001—1 | 2 |
| 2 | 0010—1 | 2 |
| 3 | 0011—0 | 2 |
| 4 | 0100—1 | 2 |
| 5 | 0101—0 | 2 |
| 6 | 0110—0 | 2 |
| 7 | 0111—1 | 4 |
| 8 | 1000—1 | 2 |
| 9 | 1001—0 | 2 |

The code to be checked is thus of the form $$(x+\alpha y)\text{-out-of-}n$$

where $x=0$, $y=2$, and $\alpha=$any number. In such a code the counting circuit 28 would count the number of pulses 42 received, corresponding to the number of register bits or devices 11 operated in each register 10 in succession, and in the interval between the completion of the pulses of a digit and before the counter-reset pulse 29, the inspect pulse 31 applied to the error detecting circuit would cause that circuit to look at the counting circuit. The error detecting circuit 32 would then only enable the recycling circuit 34 causing an error output 35 to be generated, as best seen in Fig. 1, if the counting circuit 28 has counted to other than an even number of pulses. As the counting circuit 28 is common to all the registers 10, in accordance with one aspect of this invention, this will be repeated for each digit of the information message.

Thus it is to be understood that this invention is not limited to the checking of an information message of any particular number of digits, the three-digit message described above with reference to an $x$-out-of-$n$ code being merely illustrative as this invention is particularly adapted to the checking of messages of very many coded digits. The checking of a large digit message, regardless of the specific form of the digit code, is accomplished by circuits in accordance with this invention as described above; the counting, error detecting, recycling, and reset circuits may be as above described even though a much larger message is being checked. Thus, in accordance with a feature of this invention, multi-digit messages can be checked in a single and economical circuit.

Another type of code which can readily be checked in a circuit in accordance with this invention is of the form $$((x \text{ or } x')+\alpha y)\text{-out-of-}n$$

and may be exemplified by a code in which only information in the binary form

XXXX01X is acceptable. This means that the system in which this code is employed requires that only codes corresponding to the decimal numbers 2, 3, 10, 11, 18, 19, etc., be acceptable. In such a code $x=2$, $x'=3$, and $y=8$. This specific code may also be readily checked in a circuit in accordance with our invention by applying each digit to a digit register 10 and counting the number of devices 11 operated in a register by the counting circuit 28, the circuit 29 being common to all the registers 10 in accordance with one feature of this invention. The error detecting circuit 32 is then so connected to the counting circuit 28 that it is enabled if the condition of the elements of the counting circuit 28 at the instant of the inspect pulse 31, i. e., after counting of all the bit register devices 11 that have operated in any one register 10, is other than in accord with the above stated requirements.

It is, therefore, apparent that any specific message comprising signals appearing in time sequence can be checked in accordance with this invention by registering successive digits of the message in successive digit registers 10, counting the number of register bit devices 11 operated in each digit register 10 by a single common counting circuit 28, and causing the error detecting circuit 32 to be enabled on other than the desired count or counts of the counting circuit 28.

Further, it is to be understood that while the register bit devices 11 have been disclosed as being gaseous discharge devices, any bistable device, including transistors, AND gate coincidence circuits, etc., may be employed in the registers 10.

Therefore, it is to be understood that the above described arrangements are merely illustrative of the application of the principles of this invention and that numerous other arrangements may be devised by those skilled in the art without departing from the spirit and scope of the invention.

What is claimed is:

1. A circuit for checking coded information comprising an information message of N digits coded in a code having the property that a set of received code elements is acceptable if and only if the number of active code elements is equal to at least one specified number increased by any multiple of another specified number comprising a digit register for each digit of an information message to be checked, each register comprising bit registering means for each possible pulse of a digit, means for steering the digits of said message to said registers in succession, means for enabling each bit registering means in said registers in succession whereby said bit registering means are operated on the concomitant operation of said steering means, said enabling means, and a pulse in said code, means for counting the number of bit registering means operated in a register, said means comprising a single counting circuit electrically connected to all of said bit registering means, means for inspecting the condition of said counting circuit after each digit has been stored in one of said registers, and means for resetting said circuit and transmitting an error signal if said counting circuit has counted other than a correct number of pulses in any digit in the information message.

2. A circuit for checking coded information comprising an information message of N digits coded in a code having the property that a set of received code elements is acceptable if and only if the number of active code elements is equal to at least one specified number increased by any multiple of another specified number comprising N digit registers each comprising bit registering means for each possible pulse of a digit, means for enabling each of said bit registering means in succession to operate on the appearance of a pulse in the time slot in said code represented by that bit registering means, means for counting the number of bit registering means operated in a register, said counting means comprising a single binary counting circuit and means supplying a pulse to said counting circuit on operation of each of said bit registering means in any of said registers, said counting circuit having a unique condition when an acceptable number of pulses have been counted, means for inspecting the condition of said counting circuit after each digit interval, said inspecting means comprising error detector circuit means connected to said binary counting circuit and operable to produce an output pulse on other than said unique condition in said counting circuit, and means for enabling said error detector circuit after the occurrence of the last time slot in each digit of the information message, and means responsive to said output from said error detector circuit means for resetting said registers and enabling means on appearance of said output from said error detector circuit means.

3. A circuit for checking coded information comprising an information message of N digits coded in an $x$-out-of-$n$ code appearing in time sequence comprising a digit register for each digit of a message to be checked, each register comprising bit registering means for each possible pulse of a digit, means for steering the digits of said message to said registers in succession, means for enabling each bit registering means in said registers in succession whereby said bit registering means operate on the concomitant operation of said steering means, said enabling means, and a pulse in said code, means for counting the number of bit registering means operated in a register, said means comprising a single counting circuit electrically connected to all of said devices, means for inspecting the condition of said counting circuit after each digit has been stored in said registers, and means for resetting said circuit and transmitting an error signal if said counting circuit has counted other than a correct number of pulses in any digit in said message.

4. A circuit for checking coded information comprising an information message of N digits each in an $x$-out-of-$n$ code appearing in time sequence comprising N digit registers each comprising $n$ bit registering means, means for enabling each of said bit registering means in succession to operate on the appearance of a pulse in the time slot in said code represented by that bit registering means, means for counting the number of bit registering means operated in a register, said counting means comprising a single binary counting circuit and means supplying a pulse to said counting circuit on the operation of any bit registering means, said counting circuit having a unique condition when $x$ pulses have been counted, means for inspecting the condition of said counting circuit after each digit interval, said inspecting means comprising error detecting circuit means connected to said binary counting circuit and operable to produce an output pulse on other than said unique condition in said counting circuit and means for enabling said error detector circuit means after occurrence of the $n$th time slot in each digit, and means responsive to said output from said error detector circuit means for resetting said registers and said enabling means on appearance of said output from said error detector circuit means.

5. A circuit for checking coded information comprising an information message of N digits each in an $x$-out-of-$n$ code appearing in time sequence comprising N digit registers each comprising $n$ bit registering means, means for enabling each of said bit registering means in succession to operate on the appearance of a pulse in the time slot in said code represented by that bit registering means, said enabling means comprising a digit steering circuit and a time slot commutator circuit comprising $n$ discharge devices each determinative of the enablement of a bit registering means in a time slot in the code, means for counting the number of bit registering means operated in a register, said counting means comprising a single binary counting circuit and means supplying a pulse to said counting circuit on the operation of each bit registering means, said counting circuit including discharge devices having a unique condition when $x$ pulses have been counted, means for inspecting the condition of said counting circuit after each digit interval, said inspecting means comprising error detector circuit means connected to said binary counting circuit and operable to produce an output pulse on other than said unique condition in said counting circuit and means for enabling said error detector circuit means after occurrence of the $n$th time slot in each digit, said last mentioned means including the $n$th discharge device in said time slot commutator circuit and delay means between said $n$th discharge device and said error detector circuit means, and means responsive to said output from said error detector circuit means for resetting said registers, said digit steering means, and said time slot commutator means on appearance of said output from said error detector circuit means.

6. A checking circuit in accordance with claim 5 wherein said error detecting circuit comprises a plurality of discharge devices having their grids connected to certain of the plates of said binary counting devices, an enabling pulse being provided to at least one of said grids on each condition of said counting devices other than said unique condition indicating the counting of $x$ pulses.

7. A circuit for checking coded information comprising an information message of N digits each in a 2-out-of-5 code appearing in time sequence comprising N digit registers each comprising five discharge devices, means for enabling each of said discharge devices in succession to discharge on the appearance of pulses in the time slot in said code represented by said discharge device, means for counting the number of devices discharged in a register, said counting means comprising a single binary counting circuit including a plurality of discharge devices and means supplying a pulse to said counting circuit on the firing of each register discharge device, two plates of said counting circuit devices having a unique condition when only two pulses have been counted by said counting circuit, means for inspecting the condition of said counting circuit after each digit interval, said inspecting means comprising error detector circuit means comprising two discharge devices having their grids connected to said two plates of said counting circuit devices, an enabling pulse being provided to at least one of said grids on each condition of said counting devices other than said unique condition indicating the counting of two pulses and means for enabling said error detector circuit means after the occurrence of the fifth time slot in each digit, and means responsive to said output from said error detector circuit means for resetting said registers and said discharge device enabling means on appearance of said output from said error detector circuit means.

8. A checking circuit in accordance with claim 7, wherein said discharge device enabling means comprises a digit steering circuit and a time slot commutator circuit comprising five discharge devices each determinative of the enablement of a register device in a time slot in the code and said means for enabling said detector circuit means comprises the fifth discharge device in said time slot commutator circuit and delay means between said fifth discharge device and said grids of said error detector discharge devices.

References Cited in the file of this patent

UNITED STATES PATENTS

| Number | Name | Date |
|---|---|---|
| 2,183,147 | Moore et al. | Dec. 12, 1939 |